(12) United States Patent
Ohkubo et al.

(10) Patent No.: US 7,747,383 B2
(45) Date of Patent: Jun. 29, 2010

(54) OFFSET DETECTION OF ACCELERATION SENSOR AND NAVIGATION SYSTEM

(75) Inventors: Masashi Ohkubo, Kanagawa (JP); Tomohisa Takaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 947 days.

(21) Appl. No.: 11/510,690

(22) Filed: Aug. 28, 2006

(65) Prior Publication Data

US 2007/0067096 A1 Mar. 22, 2007

(30) Foreign Application Priority Data

Sep. 6, 2005 (JP) ............................. 2005-258169
Jul. 26, 2006 (JP) ............................. 2006-203555

(51) Int. Cl.
*G01C 21/00* (2006.01)
(52) U.S. Cl. ........................... 701/200; 701/34; 701/70; 701/74; 701/79; 701/207; 701/216
(58) Field of Classification Search ................... 701/34, 701/63, 70, 74, 79, 200, 207, 216; 702/85
See application file for complete search history.

(56) References Cited

U.S. PATENT DOCUMENTS

| 4,765,649 A * | 8/1988 | Ikemoto et al. ............ 280/5.51 |
| 5,247,466 A * | 9/1993 | Shimada et al. ............ 702/141 |
| 5,265,472 A * | 11/1993 | Pfeifle et al. ............. 73/514.02 |
| 5,708,438 A * | 1/1998 | Tanaka et al. ............... 342/104 |
| 5,856,802 A * | 1/1999 | Ura et al. ................ 342/357.08 |
| 5,925,087 A * | 7/1999 | Ohnishi et al. ................. 701/70 |
| 5,974,359 A * | 10/1999 | Ohkubo ...................... 701/214 |
| 6,029,111 A * | 2/2000 | Croyle ........................ 701/207 |
| 6,240,367 B1 * | 5/2001 | Lin ............................. 701/214 |
| 6,282,496 B1 * | 8/2001 | Chowdhary ................. 701/220 |
| 6,298,287 B1 * | 10/2001 | Tazartes et al. ................ 701/4 |
| 6,308,134 B1 * | 10/2001 | Croyle et al. ................ 701/220 |
| 6,428,118 B1 * | 8/2002 | Blosch ....................... 303/9.64 |
| 7,400,946 B2 * | 7/2008 | Lee et al. ........................ 701/1 |
| 2004/0064234 A1 * | 4/2004 | Okamoto ..................... 701/70 |
| 2004/0099044 A1 * | 5/2004 | Streit et al. .................... 73/1.38 |
| 2004/0204798 A1 * | 10/2004 | Imada et al. .................... 701/1 |
| 2007/0067137 A1 * | 3/2007 | Ohkubo et al. .............. 702/142 |

* cited by examiner

*Primary Examiner*—Khoi Tran
*Assistant Examiner*—Jaime Figueroa
(74) *Attorney, Agent, or Firm*—Oblon, Spivak, McClelland, Maier & Neustadt, L.L.P.

(57) ABSTRACT

To accurately detect a zero gravity offset in an acceleration sensor. As an embodiment of the present invention, in the case where position information can be obtained from a GPS processing section, a velocity detecting unit performs an operation according to Expression (15), using real detected acceleration $\alpha Gr$ that was actually obtained from the acceleration sensor, vehicle acceleration $\alpha P$ based on the position information, distance Dm, an amount of height change Dh based on pressure PR, and gravity acceleration g. Therefore, offset acceleration $\alpha o$ can be accurately calculated, and an acceleration detection signal can be converted into detected acceleration $\alpha G$ with high accuracy, based on a zero gravity offset value Vzgo by that the above offset acceleration $\alpha o$ was converted.

15 Claims, 11 Drawing Sheets

US 7,747,383 B2

OFFSET DETECTION OF ACCELERATION SENSOR AND NAVIGATION SYSTEM

CROSS REFERENCE TO RELATED APPLICATION

The present invention contains subject matter related to Japanese Patent Applications JP2005-258169 and 2006-203555 filed in the Japanese Patent Office on Sep. 6, 2005 and Jul. 26, 2006 respectively, the entire contents of which being incorporated herein by reference.

BACKGROUND OF THE INVENTION

1. Field of the Invention

The present invention relates to an offset detecting system of an acceleration sensor, an offset detecting method of an acceleration sensor, and an offset detecting program of an acceleration sensor, and a navigation system, and is applicable to a navigation system to be installed in a vehicle, for example.

2. Description of the Related Art

Heretofore, a navigation system to be installed in a moving mobile body or the like in that the present position is calculated based on a GPS signal transmitted from a Global Positioning System (GPS) satellite, and the position and the forward direction of the above mobile body are displayed on a map screen has been widely popularized.

In such navigation system, the velocity and the forward direction of the mobile body are calculated using an acceleration sensor for detecting the acceleration of the mobile body in the forward direction and a gyro sensor (yaw rate sensor) for detecting the rotary angular velocity of the above mobile body in a horizontal direction. Thereby, the present position of the mobile body can be estimated even in the case where a GPS signal cannot be received in the shade of a building and in a tunnel, for example.

However, this acceleration sensor had a problem that output voltage when acceleration was not detected, so-called zero gravity offset varies, by the effect of the surrounding temperature, generation of heat by the navigation system itself, or the like, by its temperature characteristic.

Then, some navigation systems in which an amount of height change (height difference) is calculated using that the forward direction component of gravity acceleration is included in a detected value by an acceleration sensor when the vehicle runs on a slope, and a zero gravity offset (acceleration error) is calculated by comparing the calculated amount of height change to the known amount of height change based on height data stored in map information or the like have been proposed (see Japanese Patent Laid-Open No. 2004-233306, for example).

SUMMARY OF THE INVENTION

However, in a navigation system having the above configuration, there has been a problem that when a correct amount of height change is unknown, for example, as the time when the vehicle is running in a place of which height data is not included in map information, a zero gravity offset cannot be calculated.

In view of the foregoing, it is desirable to provide an offset detecting system of an acceleration sensor that can accurately detect a zero gravity offset in the acceleration sensor, an offset detecting method of an acceleration sensor, and an offset detecting program of an acceleration sensor, and a navigation system that can display accurate information on the position of a mobile body.

According to an embodiment of the present invention, in an offset detecting system of an acceleration sensor, an offset detecting method of an acceleration sensor, and an offset detecting program of an acceleration sensor, real detected acceleration corresponding to the result of that offset variance was added to acceleration in a forward direction in a predetermined mobile body is obtained by an acceleration sensor. Acceleration to be detected which should be primarily correctly detected is calculated by the acceleration sensor. And offset variance that the real detected acceleration varied from the acceleration to be detected by the characteristic of an acceleration sensor is calculated, based on the difference between the real detected acceleration and the acceleration to be detected.

Thereby, offset variance can be calculated only based on the difference between real detected acceleration and acceleration to be detected, and accurate acceleration in that the above offset variance is reflected can be obtained.

Further, according to an embodiment of a navigation system of the present invention, present position calculating section for receiving a positioning signal from a predetermined satellite positioning system, and calculating the present position of a predetermined mobile body, an acceleration sensor for obtaining real detected acceleration corresponding to the result of that offset variance was added to acceleration in a forward direction in the predetermined mobile body, acceleration to be detected calculating section for calculating acceleration to be detected that should be primarily correctly detected by the acceleration sensor, offset calculating section for calculating offset variance that the real detected acceleration varied from the acceleration to be detected by the characteristic of an acceleration sensor, based on the difference between the real detected acceleration and the acceleration to be detected, and information display section for calculating the acceleration using the offset variance that was calculated by the offset calculating section, and displaying information on the position of the mobile body based on the velocity of the mobile body calculated using the above acceleration are provided.

Thereby, offset variance can be calculated only based on the difference between real detected acceleration and acceleration to be detected, and accurate information on the position of a mobile body can be displayed by obtaining accurate acceleration in that the above offset variance is reflected.

The nature, principle and utility of the present invention will become more apparent from the following detailed description when read in conjunction with the accompanying drawings in which like parts are designated by like reference numerals or characters.

DETAILED DESCRIPTION OF THE PREFERRED EMBODIMENT

Preferred embodiments of the present invention will be described with reference to the accompanying drawings.

(1) First Embodiment

(1-1) Configuration of Navigation System

Figure 1:
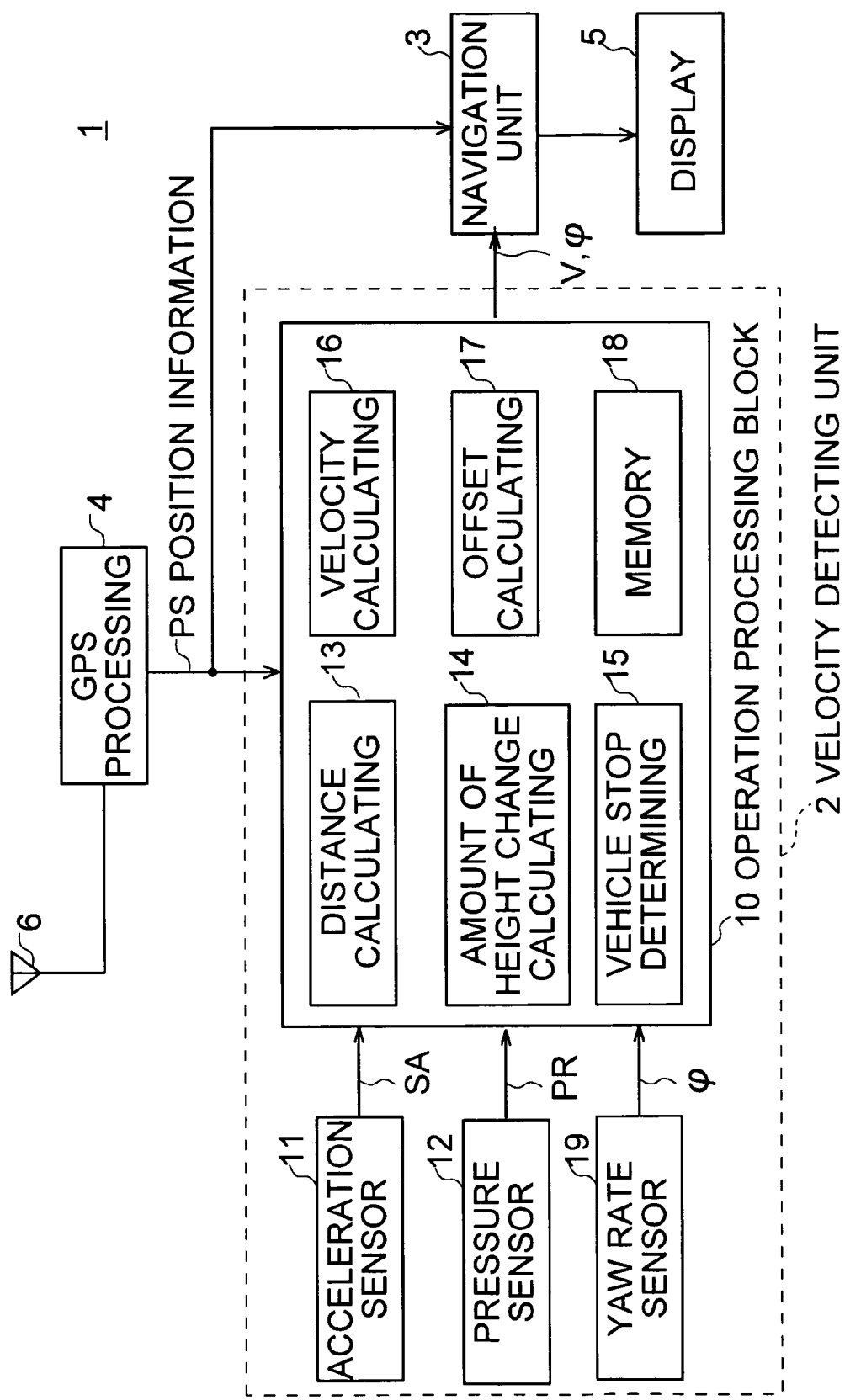
FIG. 1 is a block diagram showing the circuit configuration of a navigation system according to a first embodiment.

Referring to FIG. 1, a navigation system 1 is installed in a vehicle 100 (FIG. 2A) serving as a mobile body. The present position of the vehicle 100 is calculated by a Global Positioning System (GPS) processing section 4, based on a GPS signal received from a GPS satellite, display screen data is generated by superimposing a mark indicating the present position of the vehicle 100 or the like on predetermined map data by a navigation unit 3, and this is transmitted to a display section 5 and a display screen is displayed. Thereby, the user can see the position of the vehicle 100 on a map.

The GPS processing section 4 receives GPS signals from a plurality of GPS satellites (not shown) via a GPS antenna 6, generates position information PS by performing predetermined position calculating processing based on the GPS signals, and supplies this to an operation processing block 10 in a velocity detecting unit 2 and the navigation unit 3.

The velocity detecting unit 2 is formed centering around the operation processing block 10. An acceleration sensor 11 for detecting acceleration that operates in the forward direction of the vehicle 100, a pressure sensor 12 for detecting the surrounding pressure, and a yaw rate sensor 19 for detecting the rotary angular velocity of the vehicle 100 in the vertical direction are connected to the above operation processing block 10.

The acceleration sensor 11 generates an acceleration detecting signal SA in that potential varies within a range of from 0 V to 5 V corresponding to the acceleration operating in the forward direction of the vehicle 100, and supplies this to the operation processing block 10. In this connection, the acceleration sensor 11 is set so that when acceleration does not operate in the forward direction of the vehicle 100 at all, the potential of the acceleration detecting signal SA becomes 2.5 V (hereinafter, the potential of the acceleration detecting signal SA at this time is referred to as a zero gravity offset value Vzgo).

The pressure sensor 12 generates a pressure detecting signal SR in that potential varies within a predetermined range corresponding to the surrounding pressure, and supplies this to the operation processing block 10.

The yaw rate sensor 19 detects angular velocity $\phi$ in the vertical direction in the vehicle 100 (that is, in yaw rotary shaft revolution), and supplies this to the operation processing block 10.

The operation processing block 10 converts the acceleration detection signal SA supplied from the acceleration sensor 11 into detected acceleration $\alpha G$ operating in the forward direction of the vehicle 100 on the basis of a converted reference potential Vsc same as the zero gravity offset value Vzgo (that is, 2.5 V), and the pressure detecting signal SR supplied from the pressure sensor 12 into a pressure value PR that represents the surrounding pressure. And then, the operation processing block 10 calculates the velocity V of the above vehicle 100 based on the position information PS supplied from the GPS processing section 4 and the above detected acceleration $\alpha G$ and pressure PR, and transmits this to the navigation unit 3.

The operation processing block 10 has a central processing unit (CPU) configuration not shown, and reads various application programs such as a velocity calculating program or the like from a read-only memory (ROM) not shown and executes it. Thereby, processing functions such as a distance calculating section 13 for calculating the moving distance of the vehicle 100 in a predetermined measurement time, an amount of height change calculating section 14 for calculating the amount of height change of the above vehicle 100 in the above measurement time based on the pressure PR (the detail will be described later), a vehicle stop determining section 15 for determining whether the vehicle 100 stops or is running, a velocity calculating section 16 for calculating the velocity V of the above vehicle 100 (the detail will be described later), and an offset calculating section 17 for calculating a zero gravity offset ZGO that is included in the detected acceleration $\alpha G$ supplied from the acceleration sensor 11 (the detail will be described later) are each realized.

Further, the operation processing block 10 stores the calculated velocity V and zero gravity offset ZGO or the like in a memory section 18 being a nonvolatile memory, or reads them if it is needed.

In this connection, the navigation system 1 does not use a vehicle speed pulse signal in pulse form that is generated in the vehicle 100 and in that the cycle varies corresponding to the velocity of the above vehicle 100. Thereby, wiring processing when in installing the above navigation system 1 in the above vehicle 100 can be simplified.

In this manner, the velocity detecting unit 2 of the navigation system 1 calculates the velocity V of the vehicle 100, and also calculates a zero gravity offset ZGO that is included in the detected acceleration $\alpha G$ supplied from the acceleration sensor 11.

(1-2) Fundamental Principle of this Invention

Figure 2A:
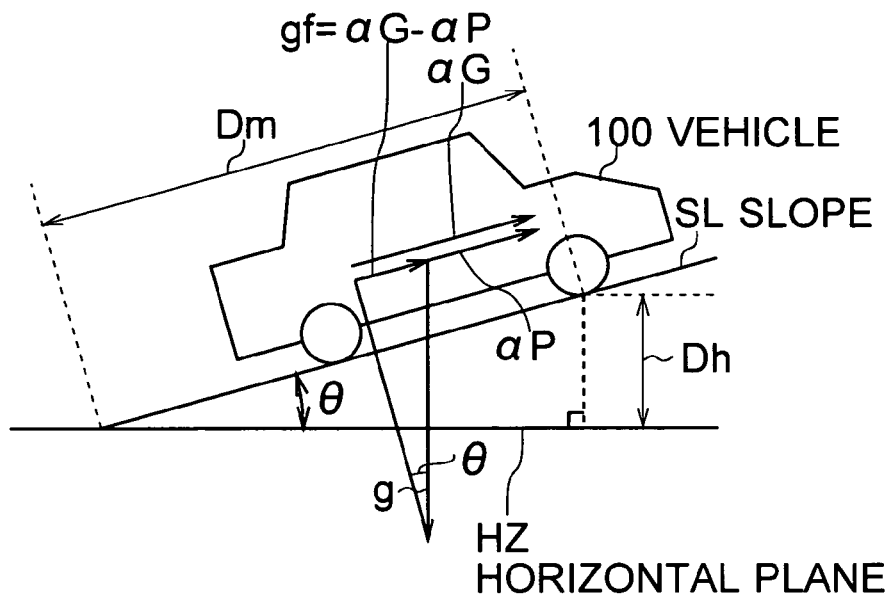
FIGS. 2A to 2C are schematic diagrams for explaining the calculation principle of an amount of height change.

The fundamental principle of this invention will be described. Here, as shown in FIG. 2A, it is assumed that the vehicle 100 is running on a slope SL having a slope angle $\theta$ to a horizontal plane HZ. In this case, the detected acceleration $\alpha G$ detected by the acceleration sensor 11 (FIG. 1) corresponds to the value that the primary acceleration caused by the movement of the vehicle 100 (hereinafter, this is referred to as vehicle acceleration $\alpha P$) was added to the forward direction component of gravity acceleration g operating on the above vehicle 100 (hereinafter, this is referred to as a gravity acceleration component gf). That is, the gravity acceleration component gf can be calculated by the difference between the detected acceleration $\alpha G$ and the vehicle acceleration $\alpha P$ as the following expression:

$$gf = \alpha G - \alpha P \tag{1}$$

The velocity detecting unit 2 (FIG. 1) of the navigation system 1 can calculate the above vehicle acceleration $\alpha P$ upon calculating distance and velocity based on a plurality of position information PS at a plurality of hours.

Figure 2B:
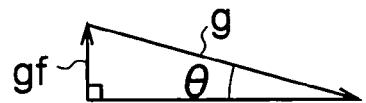
Figure 2C:
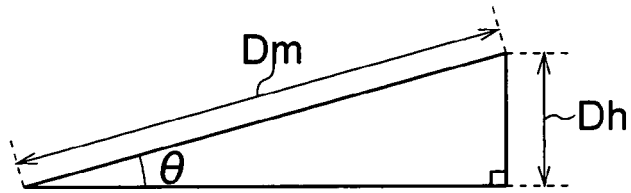

By the way, as shown in FIGS. 2B and 2C, the ratio of a distance Dm that the vehicle 100 moved on the slope SL in the measurement time mt from a certain time t0 being a measurement start point to a time t1 being a measurement finish point (for example, one second degree) to the amount of height change Dh of the above vehicle 100 in the above measurement time mt (that is, sin θ) is equal to the ratio of the gravity acceleration component gf to the gravity acceleration g (that is, sin θ). Therefore, the relationship of the following expression is satisfied.

$$\frac{gf}{g} = \frac{Dh}{Dm} \quad (2)$$

By the way, the aforementioned distance Dm can be represented using the velocity V0 of the vehicle 100 at the time t0 and the vehicle acceleration αP, in accordance with a general expression using velocity and acceleration on distance, as the following expression:

$$Dm = V0 \cdot mt + \frac{1}{2}\alpha P \cdot mt^2 \quad (3)$$

Here, if transforming Expression (2) by substituting Expressions (1) and (3), it comes to the following expression:

$$\frac{\alpha P - \alpha G}{g} \cdot \left( V0 \cdot mt + \frac{1}{2}\alpha P \cdot mt^2 \right) = Dh \quad (4)$$

(1-2-1) Calculation of Velocity

By the way, when a GPS signal from a GPS satellite cannot be received by the GPS antenna 6 as in the shade of a building, in a tunnel, or the like, the navigation unit 3 cannot calculate the present position of the vehicle 100 based on position information PS from the GPS processing section 4. Therefore, the velocity detecting unit 2 (FIG. 1) of the navigation system 1 estimates the above present position based on the velocity V and the angular velocity φ in the horizontal direction of the vehicle 100, and a map screen based on this is displayed in the display section 5.

However, since a GPS signal cannot be received in the GPS antenna 6, the velocity detecting unit 2 (FIG. 1) of the navigation system 1 cannot use a simple technique that calculates a velocity V based on a change by time passing of position information PS supplied from the GPS processing section 4.

Then, the velocity calculating section 16 of the velocity detecting unit 2 calculates a velocity V1 at a time t1 based on a velocity V0 at a time t0, without using the position information PS. Hereinafter, the principle will be described.

First, if rearranging the aforementioned Expression (4) about the vehicle acceleration αP, the following expression is obtained.

$$\alpha P = \frac{\alpha G}{2} - \frac{V0}{mt} + \sqrt{\left(\frac{\alpha G}{2} + \frac{V0}{mt}\right)^2 - \frac{2Dh \cdot g}{mt^2}} \quad (5)$$

Here, as to the velocity V1 at the time t1, the relationship of the following expression is satisfied in accordance with a general physical expression about the velocity V.

$$V1 = V0 + \alpha P \cdot mt \quad (6)$$

This means that the velocity V1 can be calculated based on the velocity V0. Here, by substituting Expression (5) in Expression (6), the following expression can be obtained:

$$V1 = \frac{\alpha G \cdot mt}{2} + \sqrt{\left(\frac{\alpha G \cdot mt}{2} + V0\right)^2 - 2Dh \cdot g} \quad (7)$$

That is, provided that an amount of height change Dh can be obtained, the velocity detecting unit 2 can calculate the velocity V1 at the time t1, by using the detected acceleration αG, the measurement time mt, the velocity V0 at the time t0, the gravity acceleration g and the above amount of height change Dh.

In this case, the velocity detecting unit 2 directly performs the operation of Expression (7). However, the above Expression (7) is a expression by that Expression (5) was substituted in Expression (6). Therefore, it means that the velocity detecting unit 2 indirectly obtains vehicle acceleration αP, and acquires the velocity V1 at the time t1 from the velocity V0 at the time t0 by using this.

(1-2-2) Determination of Vehicle Stop State

By the way, as shown in Expression (6), the velocity detecting unit 2 calculates the velocity V1 at the time t1 (that is, the present velocity V1) using the velocity V0 at the time t0 (that is, the immediately before velocity V0). Therefore, if the velocity V is wrong, also the velocity V1 becomes an erroneous value. Thus, it is necessary that the velocity detecting unit 2 surely detects the first velocity V in the vehicle 100, that is, the velocity V in the vehicle stop state as "zero".

Here, generally, when the vehicle 100 is running, the velocity V continuously varies according to the form of the road and the traffic condition or the like. Therefore, the possibility that the above velocity V is continuously a constant value is extremely low. The value of the above velocity V has variance in a certain degree. On the other hand, when the vehicle 100 stops, the velocity V does not vary from zero and is the constant value. Thus, even if considering a detection error, variance in the above velocity V is within a predetermined range.

Then, the velocity detecting unit 2 calculates variance Vvar in the velocity V in a predetermined time range (for example, for five seconds) by the vehicle stop determining section 15. If the variance Vvar is within a predetermined range, the velocity detecting unit 2 determines the vehicle 100 stops, and the velocity V at this time is corrected to zero.

Thereby, the velocity detecting unit 2 can correctly determine whether the vehicle 100 is in running state or stop state. When the vehicle 100 is in stop state, the velocity V is corrected to zero, so that the velocity V after that can be rightly calculated.

(1-2-3) Calculation of Amount of Height Change

Calculation processing of the amount of height change Dh in the velocity detecting unit 2 (FIG. 1) will be described. As shown in the aforementioned Expression (2), the velocity detecting unit 2 can calculate the amount of height change Dh by using the distance Dm, the gravity acceleration component gf (that is, the detected acceleration αG—vehicle acceleration αP) and the gravity acceleration g.

Here, when a GPS signal can be received by the GPS antenna 6, in the velocity detecting unit 2, the distance Dm that the vehicle 100 moved in the measurement time mt can be calculated in the distance calculating section 13. Thereby, the velocity V of the vehicle 100 can be calculated based on the above distance Dm. Further, the vehicle acceleration αP can be calculated based on this.

However, when a GPS signal from a GPS satellite cannot be received by the GPS antenna 6 and position information PS cannot be generated in the GPS processing section 4, the velocity detecting unit 2 cannot calculate the distance Dm and the vehicle acceleration αP. Therefore, the amount of height change Dh cannot be calculated from the relationship in Expression (2).

Then, when position information PS cannot be generated in the GPS processing section 4, the velocity detecting unit 2 converts pressure PR that was obtained from the pressure sensor 12 into height h, by using that generally, there is a correspondence relationship between pressure PR and height h.

Practically, a pressure/height correspondence table TBL by that the correspondence relationship between general pressure and height was previously tabulated has been stored in the memory section 18, and the velocity detecting unit 2 reads heights h0 and h1 corresponding to pressures PR0 and PR1 respectively from the above pressure/height correspondence table TBL, based on the pressure PR0 at the time t0 and the pressure PR1 at the time t1.

Next, the velocity detecting unit 2 calculates an amount of height change Dh being the difference between the height h0 of the vehicle 100 at the time t0 and the height h1 of the above vehicle 100 at the time t1, in accordance with the following expression:

$$Dh = h1 - h0 \quad (8)$$

Here, as to the amount of height change Dh, if taking into consideration the range of slopes in general roads and the running performance of the vehicle 100 (that is, moving distance per unit time) or the like, it can be considered that the high limit value and the low limit value in the range that can be actually taken (hereinafter, this is referred to as a height change range) exist.

On the other hand, in the case where the vehicle 100 actually runs on the road, there is a possibility that for example, when the window of the above vehicle 100 was opened or closed, when the vehicle 100 enters a tunnel, or when the vehicle 100 passes by an adjacent traffic line, the pressure in the vehicle room by these factors other than the change of height (hereinafter, these factors are referred to as non-height factors).

In such case, the velocity detecting unit 2 calculates an erroneous height h based on pressure PR that received the effect of a non-height factor. Thereby, also the amount of height change Dh becomes an erroneous value.

By the way, when the vehicle 100 receives the effect of such non-height factor, it is considered that the pressure PR in the vehicle room suddenly changes in comparison to the case caused by only height. That is, the possibility that the amount of height change Dh at this time is out of the range of height changes is high.

Then, in the case where the amount of height change Dh calculated by Expression (8) is out of the range of height changes, it is regarded that the vehicle 100 is receiving the effect of a non-height factor, and the velocity detecting unit 2 corrects the above amount of height change Dh.

Concretely, the maximum value of the slope angle θ (FIG. 2) actually takable is defined as the maximum slope angle θmax (for example, 0.05π rad or the like), and the velocity detecting unit 2 determines whether or not the following expression using the calculated amount of height change Dh and the velocity immediately before V0 is satisfied.

$$|Dh| \leq V0 \cdot \sin \theta \max \quad (9)$$

In this connection, the right side of Expression (9) represents "the maximum height difference that can be assumed from the velocity immediately before V0" as a whole, by multiplying sin (θ max) by the velocity immediately before V0.

Here, when Expression (9) is satisfied, it is regarded that the amount of height change Dh calculated by Expression (8) is not receiving the effect of a non-height factor and is a correct value, and the velocity detecting unit 2 performs the following processing without specially performing correction.

On the other hand, if Expression (9) is not satisfied, it is regarded that the amount of height change Dh calculated by Expression (8) is receiving the effect of a non-height factor, and the velocity detecting unit 2 calculates a corrected amount of height change Dhc in accordance with the following Expression:

$$Dhc = V0 \cdot \sin(\theta \max) \cdot \frac{|Dh|}{Dh} \quad (10)$$

And then, the velocity detecting unit 2 performs the following processing by setting this corrected amount of height change Dhc as a new amount of height change Dh.

In this case, the velocity detecting unit 2 cannot calculate a correct amount of height change Dh from the pressure PR in the vehicle room. Therefore, as the second best scheme, the velocity detecting unit 2 calculates the corrected amount of height change Dhc as a takable maximum amount of height change Dh, and uses this as an amount of height change Dh.

On the other hand, pressure generally becomes a different value corresponding to height. Even if it is at the same height, the pressure slowly varies by the effect of weather such as low pressure and high pressure. However, the measurement time mt being a time difference when the velocity detecting unit 2 detects the pressures PR0 and PR1 (approximately one second) is sufficiently shorter than the time when a significant pressure change occurs by the effect of weather. Therefore, it can be regarded that the amount of height change Dh as a relative difference between heights h does not receive the effect of the pressure by weather or the like.

Accordingly, the velocity detecting unit 2 can obtain a highly reliable amount of height change Dh by the pressure/height correspondence table TBL and Expression (8). And thus calculated amount of height change Dh can be applied to Expression (7).

In this case, since the velocity detecting unit 2 cannot calculate a correct vehicle acceleration αP, it cannot directly calculate the gravity acceleration component gf included in the detected acceleration αG by the relationship in Expression (1). However, the above gravity acceleration component gf can be offset by the amount of height change Dh by utilizing the relationship shown in Expression (2). Consequently, a velocity V can be calculated with high accuracy by Expression (7), irrespective of the above gravity acceleration component gf.

(1-2-4) Calculation of Zero Gravity Offset

Figure 3A:
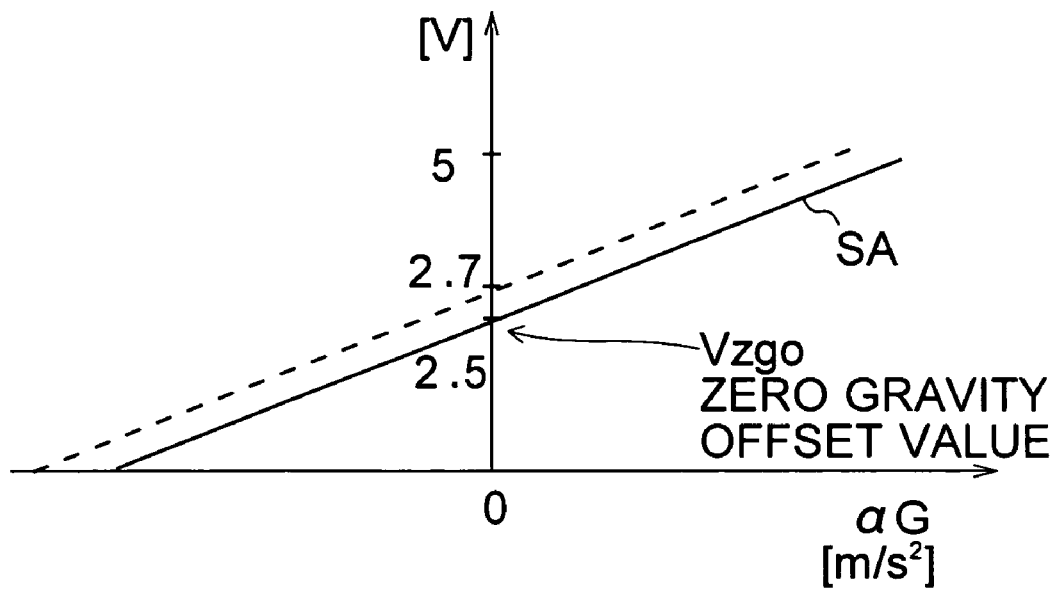
FIGS. 3A and 3B are schematic diagrams for explaining variations in zero gravity offset and the updating of converted reference potential.

By the way, in the acceleration sensor 11 (FIG. 1), when acceleration is not operating in the forward direction of the above vehicle 100 as the time when the vehicle 100 stops on a horizontal plane HZ (FIG. 2), as shown in FIG. 3A, the potential of an acceleration detecting signal SA outputted from the above acceleration sensor 11, that is, a zero gravity offset value Vzgo becomes 2.5 V.

However, in the acceleration sensor 11, on its property, the zero gravity offset value Vzgo sometimes varies from 2.5 V to 2.6 V or 2.7 V or the like (shown by a broken line in FIG. 3A), by the effect of the surrounding temperature change or the like.

Figure 3B:
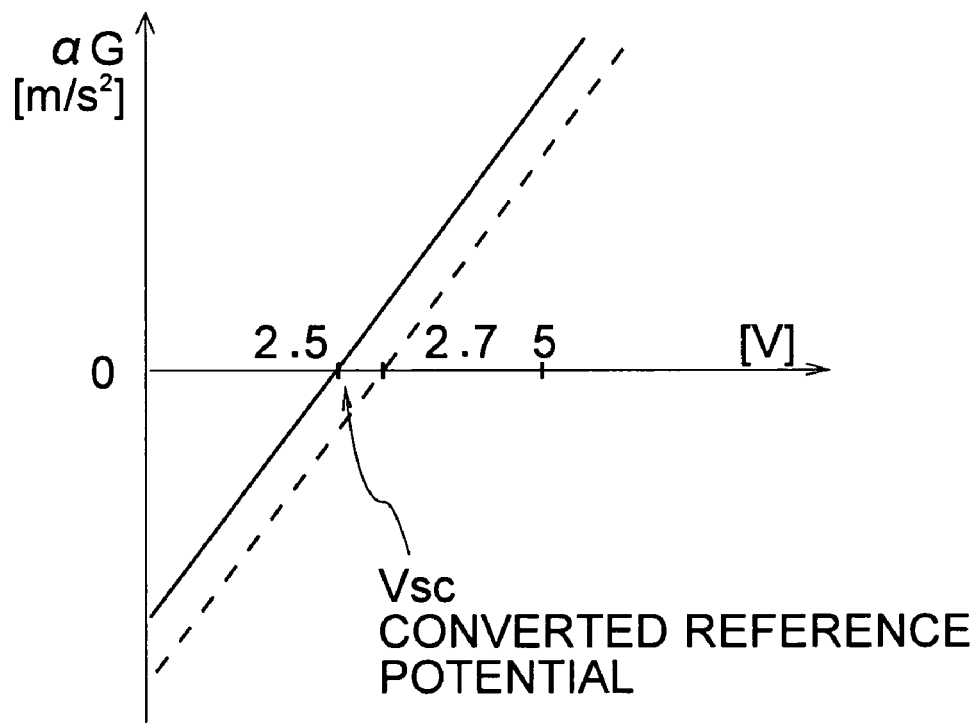

At this time, in the velocity detecting unit 2, although the zero gravity offset value Vzgo varied from 2.5 V, as shown in FIG. 3B, converted reference potential Vsc when it is converted from the acceleration detecting signal SA into the detected acceleration αG in the operation processing block 10 is set to the zero gravity offset value Vzgo before variance as it is (that is, 2.5 V), it is converted into an erroneous detected acceleration αG. Thus, also a velocity V calculated by the aforementioned Expression (7) becomes an erroneous value.

Therefore, it is desirable that after the velocity detecting unit 2 converts the acceleration detecting signal SA from the acceleration sensor 11 into a correct detected acceleration αG, by updating the converted reference potential Vsc based on the zero gravity offset value Vzgo, upon detecting the above zero gravity offset value Vzgo after variance.

Here, as to an actual detected acceleration αG by that the acceleration detecting signal SA outputted from the acceleration sensor 11 was converted (hereinafter, this is referred to as a real detected acceleration αGr), the relationship of the following expression using the detected acceleration αG that should be primarily detected by the acceleration sensor 11 (hereinafter, this is referred to as acceleration to be detected αGi) and the acceleration corresponding to the variance of the zero gravity offset value Vzgo (hereinafter, this is referred to as offset acceleration αo) is satisfied.

$$\alpha Gr = \alpha Gi + \alpha o \quad (11)$$

By transforming this, the following expression is obtained.

$$\alpha o = \alpha Gr - \alpha Gi \quad (12)$$

That is, it can be known that the offset acceleration αo can be calculated as the difference between the real detected acceleration αGr and the acceleration to be detected αGi.

Here, as to the acceleration to be detected αGi, the relationship in the aforementioned Expression (1) can be applied. Thus, Expression (12) can be replaced by the following expression:

$$\alpha o = \alpha Gr - (\alpha P + gf) \quad (13)$$

Further, the following expression can be obtained by transforming the aforementioned Expression (2):

$$gf = \frac{Dh}{Dm} \cdot g \quad (14)$$

Here, in the velocity detecting unit 2, as shown in Expression (8), the amount of height change Dh can be calculated based on the pressure PR obtained from the pressure sensor 12 (FIG. 1). As to the distance Dm and the vehicle acceleration αP in the measurement time mt, as described above, in the case where a GPS signal PS can be received by the GPS antenna 6 (FIG. 1), the above distance Dm is obtained based on the position information PS in the distance calculating section 13. Further, the above vehicle acceleration αP can be calculated by using this.

That is, in the case where a GPS signal can be received by the GPS antenna 6, the velocity detecting unit 2 can calculate the offset acceleration αo by substituting the real detected acceleration αGr, the vehicle acceleration αP, the amount of height change Dh, the distance Dm and the gravity acceleration g in the following expression that is obtained by applying Expression (14) to the aforementioned Expression (13).

$$\alpha o = \alpha Gr - \left(\alpha P + \frac{Dh}{Dm} \cdot g\right) \quad (15)$$

At this time, the velocity detecting unit 2 can obtain the latest zero gravity offset value Vzgo by converting the offset acceleration αo. Further, by updating the converted reference potential Vsc stored in the memory section 18 (FIG. 1) to the same value as the above zero gravity offset value Vzgo, the acceleration detecting signal SA from the acceleration sensor 11 can be converted into a correct detected acceleration αG in that the variance of the zero gravity offset value Vzgo is considered in the operation processing block 10.

In this connection, in the case where a GPS signal can be received by the GPS antenna 6 and position information PS can be obtained from the GPS processing section 4, the velocity detecting unit 2 calculates the offset acceleration αo on occasion in accordance with Expression (15) and updates the converted reference potential Vsc on occasion. In the case where the above GPS signal cannot be received, the velocity detecting unit 2 calculates a velocity V in accordance with Expression (7), using a correct detected acceleration αG based on the latest converted reference potential Vsc, that is, in that the variance of the zero gravity offset value Vzgo is considered.

(1-3) Velocity Output Processing

Next, a velocity output processing procedure when the velocity detecting unit 2 calculates the velocity V of the vehicle 100 and outputs it to the navigation unit 3 will be described with reference to the flowchart of FIG. 4.

If the power of the navigation system 1 is turned on, the operation processing block 10 of the velocity detecting unit 2 starts the velocity output processing procedure RT1 and proceeds to step SP1. At step SP1, the operation processing block 10 calculates a variance Vvar in the velocity V that was calculated for the past 15 seconds to determine whether or not the vehicle 100 is in a stop state by the vehicle stop determining section 15, and proceeds to the next step SP2.

At step SP2, the operation processing block 10 determines whether or not the variance Vvar of the velocity V that was calculated in step SP1 by the vehicle stop determining section 15 is within a predetermined threshold value or less. If an affirmative result is obtained here, this means that since the variance Vvar is comparatively small, the possibility that the vehicle 100 is in a stop state is extremely high. At this time, the operation processing block 10 proceeds to the next step SP3.

At step SP3, the operation processing block 10 corrects the velocity immediately before V0 stored in the memory section 18 to zero, and proceeds to the next step SP4.

On the other hand, if a negative result is obtained in step SP2, this means that since the variance Vvar of the velocity V is large in a certain degree, the possibility that the vehicle 100 is in a running state is high. At this time, the operation processing block 10 proceeds to the next step SP4, without specially correcting the velocity immediately before V0.

At step SP4, the operation processing block 10 determines whether or not position information PS was obtained from the GPS processing section 4. If an affirmative result is obtained here, this means that the velocity of the vehicle 100 can be calculated based on the position information PS that could be obtained from the GPS processing section 4. At this time, the operation processing block 10 proceeds to the next subroutine SRT1.

At subroutine SRT1, the operation processing block 10 calculates offset acceleration $\alpha$o in accordance with the aforementioned Expression (15) by the offset calculating section 17 and updates a converted reference potential Vsc (the detail will be described later), and proceeds to the next step SP5.

In this connection, the operation processing block 10 calculates the present velocity V based on the position information PS in the process for calculating the offset acceleration $\alpha$o in the subroutine SRT1.

On the other hand, if a negative result is obtained in step SP4, this means that since the position information PS cannot be obtained from the GPS processing section 4, it is necessary to calculate the velocity V without using the position information PS. At this time, the operation processing block 10 proceeds to the next subroutine SRT2.

At the subroutine SRT2, the operation processing block 10 calculates the present velocity V (a velocity V1) by the velocity calculating section 16 in accordance with the aforementioned Expression (7) (the detail will be described later), and proceeds to the next step SP6.

At step SP6, the operation processing block 10 transmits the velocity V to the navigation unit 3, and proceeds to the next step SP6.

At step SP6, the operation processing block 10 awaits until the measurement time mt passes, and then returns to step SP1 again to repeat a series of processing.

(1-3-1) Offset Acceleration Calculating Processing

Next, offset acceleration calculating processing when the operation processing block 10 calculates offset acceleration $\alpha$o is calculated by the velocity calculating section 17 will be described with reference to the flowchart of FIG. 5. Note that, here, the present time is assumed as a time t1, and the time which is measurement time mt ago from the above time t1 is assumed as a time t0.

Figure 4:
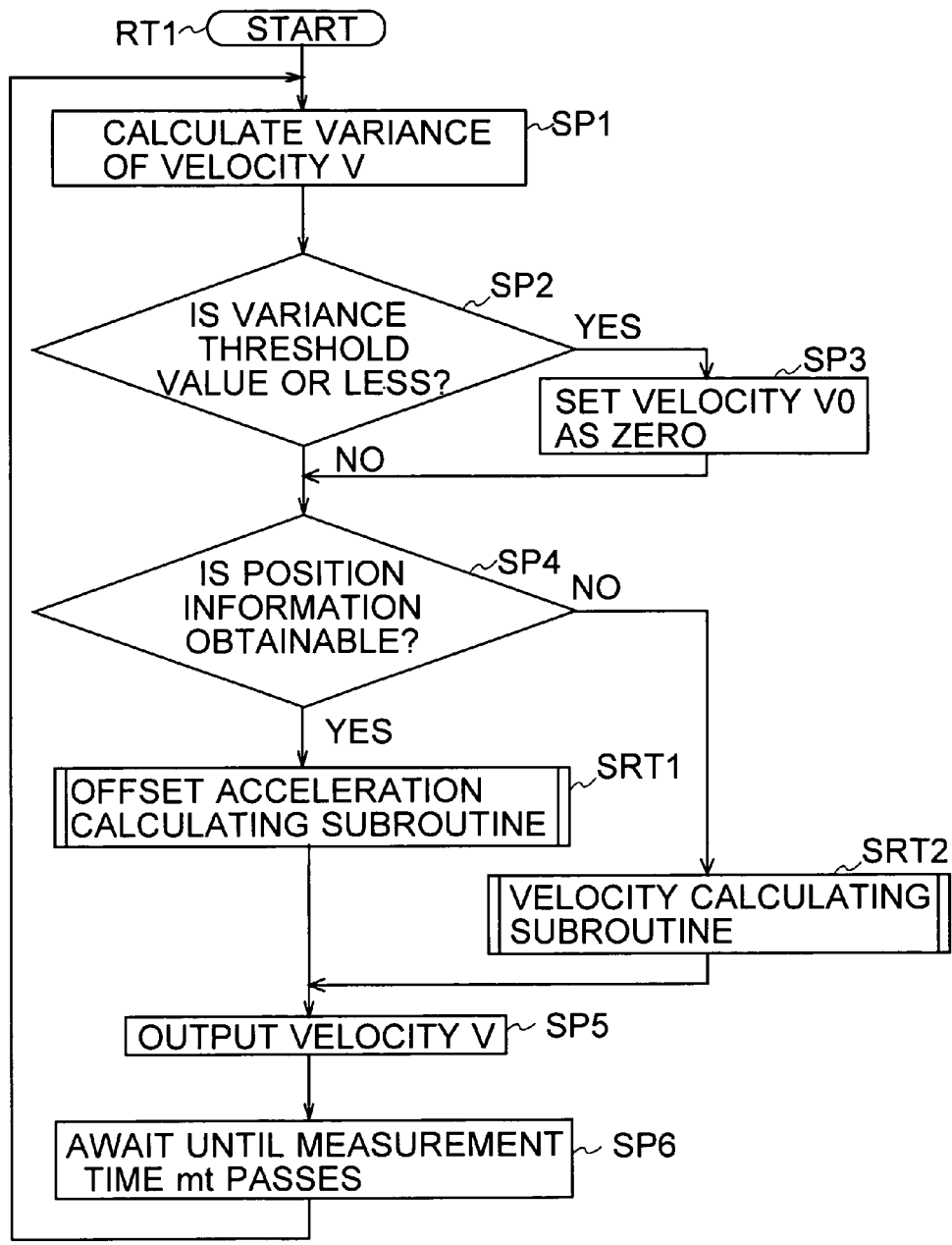
FIG. 4 is a flowchart showing a velocity output processing procedure according to the first embodiment.
Figure 5:
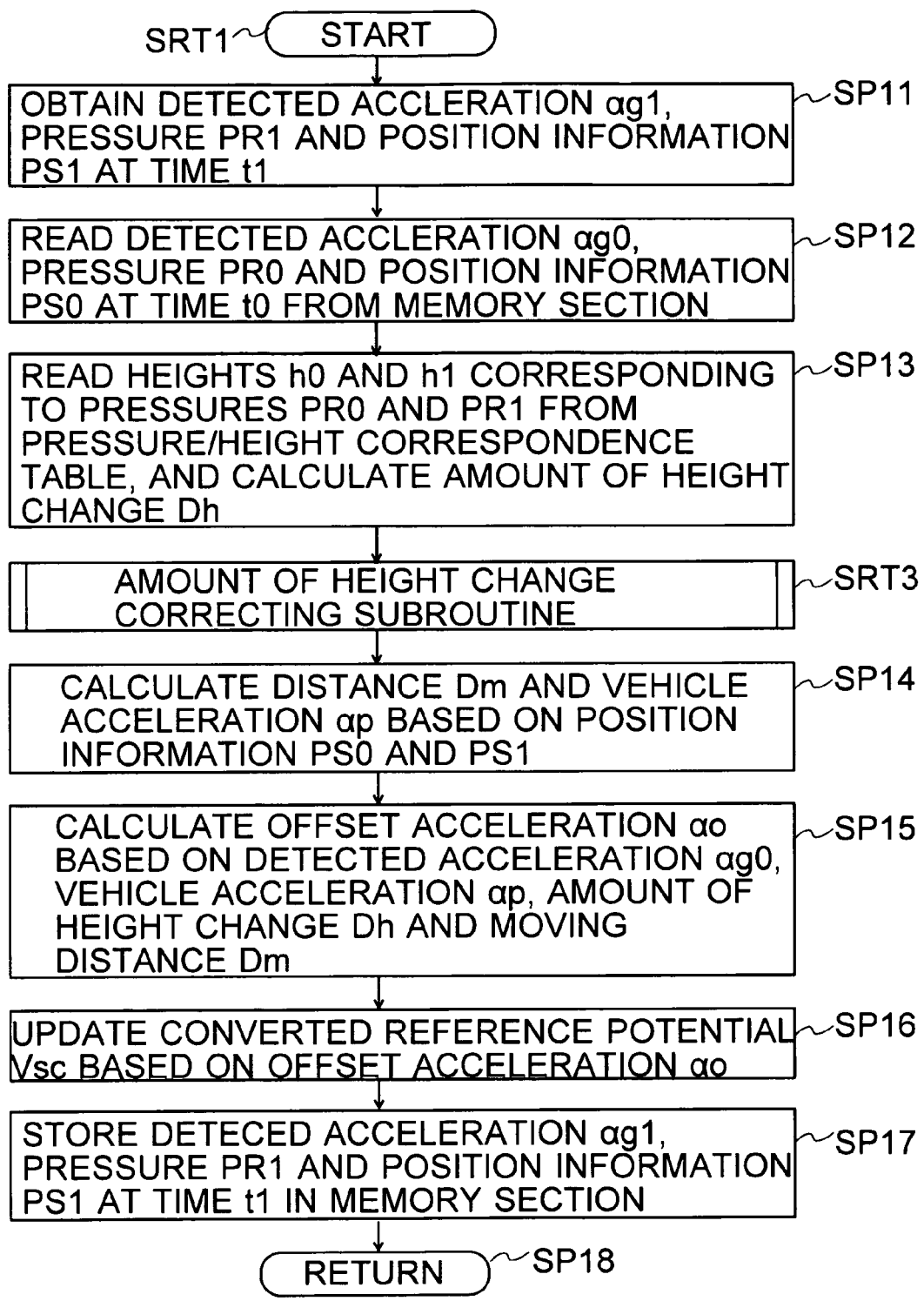
FIG. 5 is a flowchart showing an offset acceleration calculating processing procedure.

The operation processing block 10 starts offset acceleration calculating subroutine SRT1 shown in FIG. 5 responding to a call from the velocity output processing procedure RT1 (FIG. 4), and proceeds to step SP11. At step SP11, the operation processing block 10 acquires detected acceleration $\alpha$G at the present time t1 from the acceleration sensor 11, acquires pressure PR1 from the pressure sensor 12, and further acquires position information PS1 from the GPS processing section 4, and proceeds to the next step SP12.

At step SP12, the operation processing block 10 reads detected acceleration $\alpha$G at the time t0, pressure PR0 and position information PS0 that have been previously stored in the memory section 18, and proceeds to the next step SP13.

Figure 6:
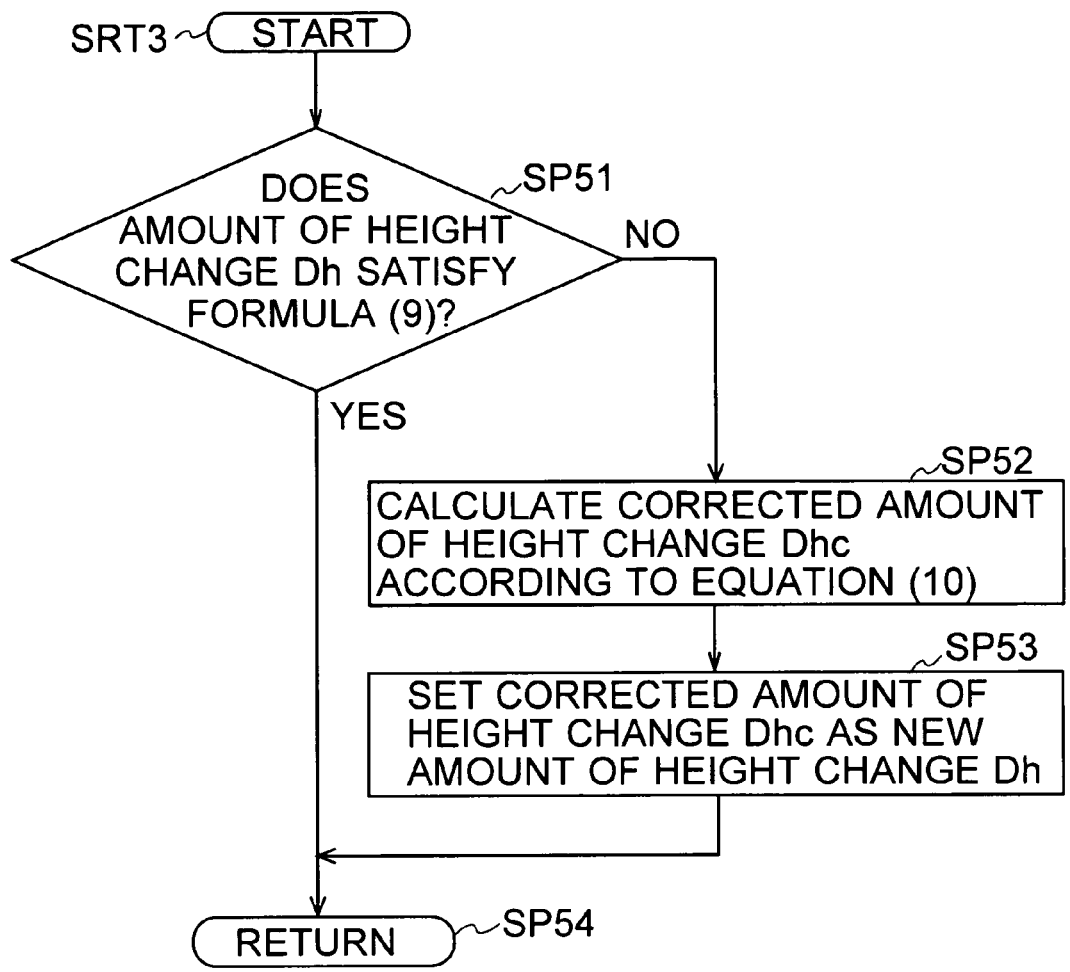
FIG. 6 is a flowchart showing an amount of height change correcting processing procedure.

At step SP13, the operation processing block 10 reads heights h0 and h1 corresponding to the pressure PR0 and PR1 using the pressure/height correspondence table TBL stored in the memory section 18, and calculates an amount of height change Dh in accordance with Expression (8), and then proceeds to the next amount of height change correcting subroutine SRT3 (FIG. 6).

The operation processing block 10 proceeds to step SP51 to determine whether or not the amount of height change Dh satisfies Expression (9), that is, whether or not the amount of height change Dh is receiving the effect of a non-height factor. If an affirmative result is obtained here, this means that the possibility that the amount of height change Dh is not receiving the effect of a non-height factor is high and correction of the above amount of height change Dh is unnecessary. At this time, the operation processing block 10 proceeds to step SP54 to finish subroutine SRT3 and returns to the former subroutine SRT1 (FIG. 5).

On the other hand, if a negative result is obtained in step SP51, this means that the possibility that the amount of height change Dh is receiving the effect of a non-height factor is high and correction should be performed on the above amount of height change Dh. At this time, the operation processing block 10 proceeds to the next step SP52.

At step SP52, the operation processing block 10 calculates a corrected amount of height change Dhc in accordance with Expression (10), proceeds to the next step SP53 to set the above corrected amount of height change Dhc as a new amount of height change Dh, and proceeds to the next step SP54.

At step SP54, the operation processing block 10 finishes routine RT3, returns to the former subroutine SRT1 (FIG. 5), and proceeds to step SP14.

At step SP14, the operation processing block 10 calculates a distance Dm that the vehicle 100 moved in the measurement time mt based on the position information PS0 and PS1 by the distance calculating section 13, further calculates a velocity V based on the above distance Dm, and then calculates vehicle acceleration $\alpha$P, and proceeds to the next step SP15.

At step SP15, the operation processing block 10 calculates offset acceleration $\alpha$o in accordance with Expression (15), using real detected acceleration $\alpha$Gr (in this case, detected acceleration $\alpha$G0), the vehicle acceleration $\alpha$P, the amount of height change Dh, the distance Dm and the gravity acceleration g, and proceeds to the next step SP16.

At step SP16, the operation processing block 10 calculates a zero gravity offset value Vzgo by converting the offset acceleration $\alpha$o into potential, and updates the converted reference potential Vsc stored in the memory section 18 to the same value as the above zero gravity offset value Vzgo, and proceeds to the next step SP17.

At step SP17, the operation processing block 10 stores the detected acceleration $\alpha$G1, the pressure PR1 and the position information PS1 at the present time t1 in the memory section 18 for the time when in calculating offset acceleration $\alpha$o next time, proceeds to the next step SP18 to finish this offset acceleration calculating subroutine SRT1, and returns to the former velocity output processing procedure RT1 (FIG. 4).

(1-3-2) Velocity Calculating Processing

Next, velocity calculating processing at the time when the operation processing block 10 calculates a velocity V by the velocity calculating section 16 when position information PS cannot be obtained from the GPS processing section 4 will be described with reference to the flowchart of FIG. 7. Note that, here, the present time is assumed as a time t1, and the time which is measurement time mt ago from the above time t1 is assumed as a time t0.

Figure 7:
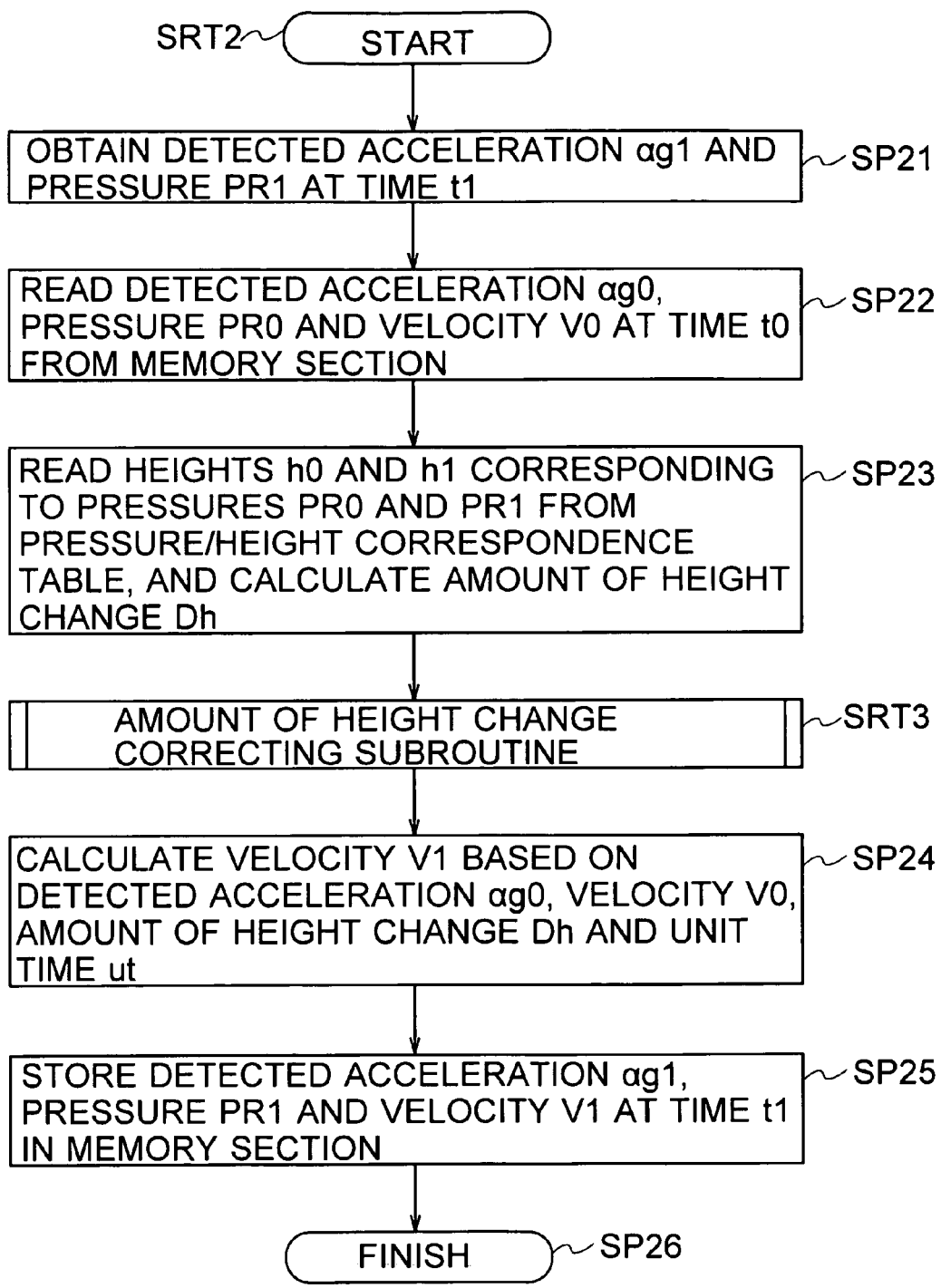
FIG. 7 is a flowchart showing a velocity calculating processing procedure.

The operation processing block 10 starts velocity calculating subroutine SRT2 shown in FIG. 7 responding to a call from the velocity output processing procedure RT1 (FIG. 4), and proceeds to step SP21. At step SP21, the operation processing block 10 acquires detected acceleration aG1 at the present time t1 from the acceleration sensor 11, and also acquires pressure PR1 from the pressure sensor 12, and proceeds to the next step SP22.

At step SP22, the operation processing block 10 reads detected acceleration $\alpha G0$, pressure PR0 and a velocity V0 at the time t0 that have been previously stored in the memory section 18, and proceeds to the next step SP23.

At step sP23, the operation processing block 10 reads heights h0 and h1 corresponding to the pressure PR0 and PR1 using the pressure/height correspondence table TBL stored in the memory section 18, similarly to step SP13 in the offset acceleration calculating subroutine SRT1 (FIG. 4), and calculates an amount of height change Dh in accordance with Expression (8), and then proceeds to the subroutine SRT3 (FIG. 6).

In subroutine SRT3, similarly to the case of subroutine SRT1, the operation processing block 10 determines whether or not the amount of height change Dh is receiving the effect of a non-height factor using Expression (9). If receiving, the operation processing block 10 calculates a corrected amount of height change Dhc in accordance with Expression (10) and set this as a new amount of height change Dh so as to correct the above amount of height change Dh, and then, returns to the former subroutine SRT2 (FIG. 7) and proceeds to the next step SP24.

At step SP24, the operation processing block 10 calculates a velocity V1 at the present time t1 in accordance with Expression (7), using the detected acceleration $\alpha G0$, the velocity V0 at the time t0, the amount of height change Dh, the measurement time mt and the gravity acceleration g, and proceeds to the next step SP25.

At step SP25, the operation processing block 10 stores the detected acceleration $\alpha G1$, the pressure PR1 and the velocity V1 at the present time t1 in the memory section 18 for the time when in calculating a velocity V next time, proceeds to the next step SP26 to finish this velocity calculating subroutine SRT2, and returns to the former velocity output processing procedure RT1 (FIG. 4).

(1-4) Operation and Effect

According to the above configuration, in the case where a GPS signal can be received from the GPS antenna 6, the velocity detecting unit 2 calculates offset acceleration $\alpha o$ by substituting the real detected acceleration $\alpha Gr$, the vehicle acceleration $\alpha P$, the amount of height change Dh, the distance Dm and the gravity acceleration g in Expression (15).

Therefore, in the case where position information PS can be obtained from the GPS processing section 4, the velocity detecting unit 2 can accurately calculate offset acceleration $\alpha o$, by using the real detected acceleration $\alpha Gr$ that was actually obtained from the acceleration sensor 11, the vehicle acceleration $\alpha P$ based on the position information PS, the distance Dm, the amount of height change Dh based on the pressure PR, and the gravity acceleration g.

In this case, the velocity detecting unit 2 cannot directly obtain the value of acceleration to be detected $\alpha Gi$. However, the velocity detecting unit 2 can accurately calculate offset acceleration $\alpha o$ in accordance with Expression (15), based on the difference between the real detected acceleration $\alpha Gr$ that was actually obtained from the acceleration sensor 11, and the acceleration to be detected $\alpha Gi$ that was obtained based on the vehicle acceleration $\alpha P$ based on the above position information PS, the amount of height change Dh, the distance Dm and the gravity acceleration g (that is, the terms in ( ) of Expression (15)).

Especially, since the amount of height change Dh is calculated based on the pressure PR, it is unnecessary that the above amount of height change Dh has been previously obtained by map information or the like. Therefore, the velocity detecting unit 2 can calculate acceleration to be detected $\alpha Gi$ irrespective of the presence or absence of height data. Thus, offset acceleration $\alpha o$ can be calculated.

Further, since the velocity detecting unit 2 can convert the pressure PR into height h using the pressure/height correspondence table TBL previously stored in the memory section 18, the quantity of operation processing can be reduced in comparison to the case where the above height h is calculated in accordance with predetermined operation processing using the above pressure PR.

Further, if it is regarded that the amount of height change Dh is receiving the effect of a non-height factor by determination using Expression (9), the velocity detecting unit 2 calculates a corrected amount of height change Dhc in accordance with Expression (10). Thereby, the velocity detecting unit 2 can correct the amount of height change Dh that has high possibility of being a largely erroneous value by the non-height factor by only Expression (8) to a corrected amount of height change Dhc being, as it were, the second best value. Therefore, the range of errors in the above amount of height change Dh and the value of the velocity V that is calculated using the above amount of height change Dh can be lessened.

Further, the velocity detecting unit 2 can calculate offset acceleration $\alpha o$ when the vehicle is running. Therefore, such trouble that offset acceleration $\alpha o$ has to be detected in a still state in a level place, that is necessary in conventional techniques becomes unnecessary, and the calculating condition of the above offset acceleration $\alpha o$ can be vastly relaxed.

Thereby, the velocity detecting unit 2 can obtain the latest zero gravity offset value Vzgo by converting the above offset acceleration $\alpha o$. Thus, the acceleration detection signal SA can be accurately converted into detected acceleration $\alpha G$ based on the above zero gravity offset value Vzgo, without affected by the temperature characteristic of the acceleration sensor 11.

Moreover, the velocity detecting unit 2 can calculate offset acceleration $\alpha o$ every measurement time mt. Thereby, the offset acceleration $\alpha o$ having the possibility of varying at any time by that the temperature of the navigation system 1 crimes with time can be updated on occasion, so that it almost always can be converted into accurate detected acceleration $\alpha G$.

According to the above configuration, in the case where position information PS can be obtained from the GPS processing section 4, the velocity detecting unit 2 can accurately calculate offset acceleration $\alpha o$ in accordance with Expression (15), by using the real detected acceleration $\alpha Gr$ that was actually obtained from the acceleration sensor 11, the vehicle acceleration $\alpha P$ based on the position information PS, the distance Dm, the amount of height change Dh based on the pressure PR, and the gravity acceleration g. Thereby, the velocity detecting unit 2 can accurately correct the acceleration detection signal SA into detected acceleration $\alpha G$ based on the zero gravity offset value Vzgo by that the above offset acceleration $\alpha o$ was converted.

(2) Second Embodiment (2-1) Configuration of Navigation System

Figure 8:
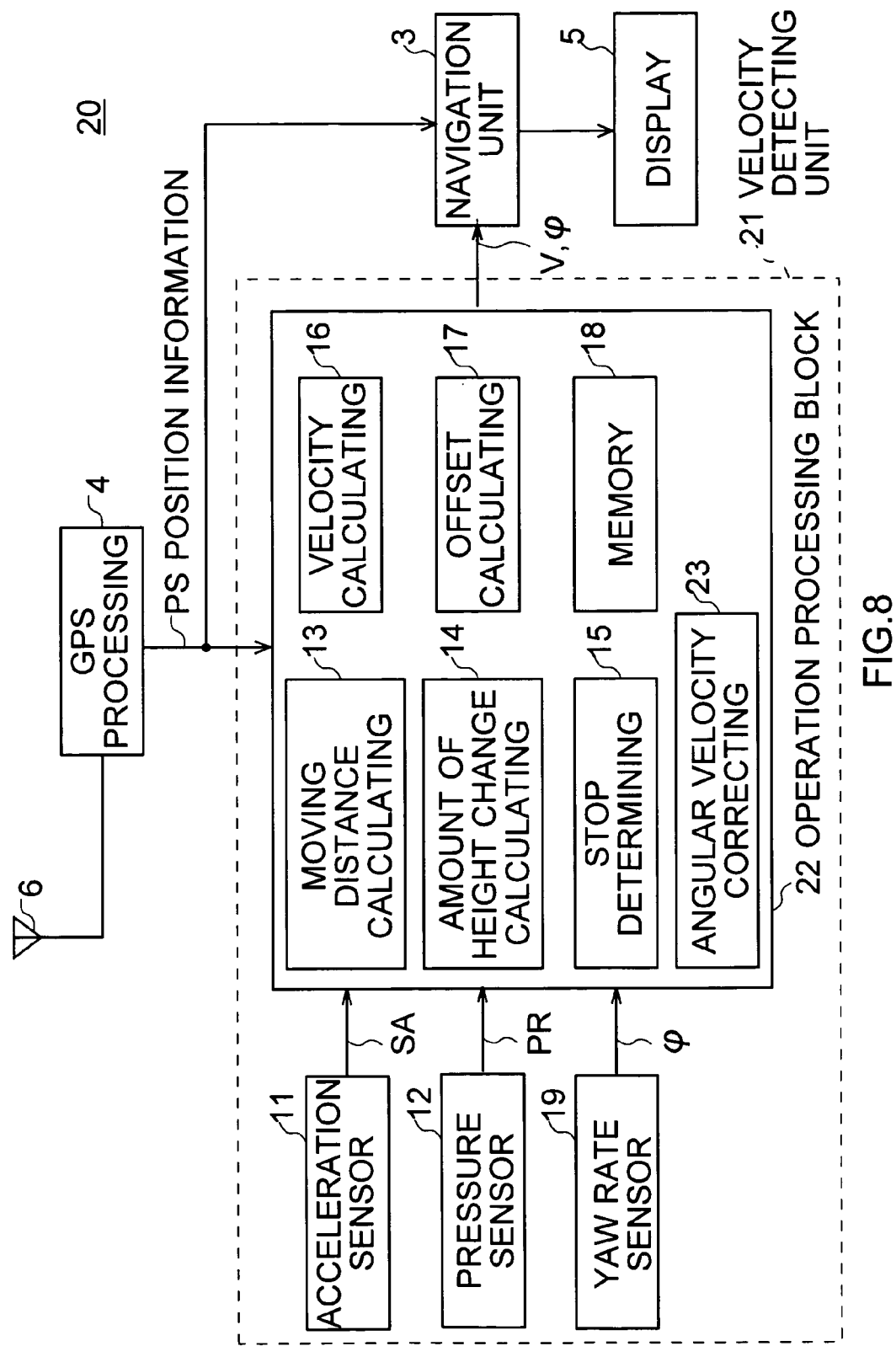
FIG. 8 is a block diagram showing the circuit configuration of a navigation system according to a second embodiment.

As shown in FIG. 8 in that the same reference numerals are added to the corresponding parts in FIG. 1, a navigation system 20 in a second embodiment has a similar configuration to the navigation system 1 (FIG. 1) other than that a velocity detecting unit 21 is provided instead of the velocity detecting unit 2.

The velocity detecting unit 21 has an operation processing block 22 instead of the operation processing block 10 in the velocity detecting unit 2 (FIG. 1). In the operation processing block 22, in addition to the configuration of the operation processing block 10, an angular velocity correcting section 23 for performing the correcting processing of an angular velocity φ supplied from the yaw rate sensor 19 is provided.

Figure 9A:
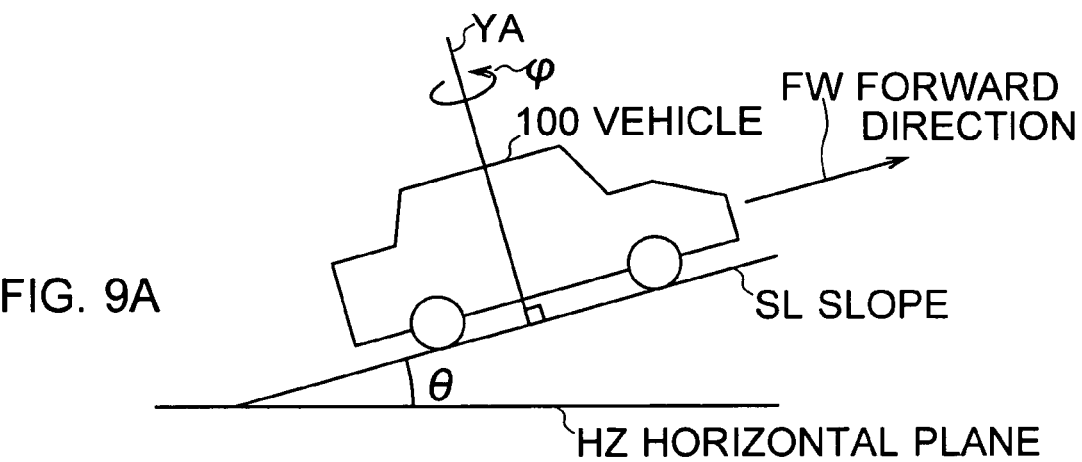
FIGS. 9A and 9B are schematic diagrams for explaining angular velocity correction.

As shown in FIG. 9A that corresponds to FIG. 2A, it is assumed that the vehicle 100 is running on a slope SL that has a slope angle θ to a horizontal plane HZ, in a forward direction FW.

Figure 9B:
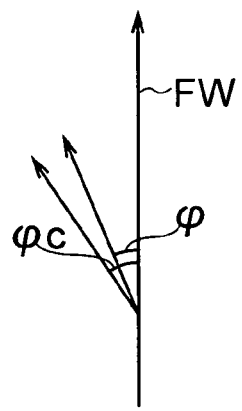

Here, as shown in FIG. 9B, an angular velocity φ detected by the yaw rate sensor 19 represents a rotary angular velocity centering the vertical yaw rotary shaft YA of the above vehicle 100 on the slope SL.

In this case, since the vehicle 100 is running on the slope SL, the angular velocity φ detected by the yaw rate sensor 19 is a value obtained by that cos θ was multiplied by the actual rotary angular velocity of the vehicle 100.

Then, as an advance preparation, the angular velocity correcting section 23 (FIG. 8) of the operation processing block 22 calculates sin θ by utilizing the relationship of the following expression as shown in FIG. 2C, by using the amount of height change Dh that was calculated in accordance with Expression (8) and a moving distance Dm that was obtained based on the velocity V calculated in accordance with Expression (7).

$$Dh = Dm \cdot \sin\theta \tag{16}$$

The angular velocity correcting section 23 calculates a cos θ using this, by the following expression based on a general characteristic of a trigonometric function.

$$\cos\theta = \sqrt{1-\sin^2\theta} \tag{17}$$

Next, by using this cos θ, the angular velocity correcting section 23 calculates a corrected angular velocity φc as shown in FIG. 9B by the following Expression, and transmits this to the navigation unit 3 with the velocity V that was calculated based on Expression (7).

$$\phi c = \frac{\phi}{\cos\theta} \tag{18}$$

According to this, in the case where a GPS signal cannot be received by the GPS antenna 6 and position information PS cannot be obtained from the GPS processing section 4, the navigation unit 3 performs so-called dead reckoning (dead reckoning navigation) that calculates the present estimated position of the vehicle 100 from the position of the vehicle 100 immediately before based on a GPS signal velocity V and the corrected angular velocity φc.

At this time, even if the vehicle 100 is running on the slope SL and the angular velocity φ detected by the yaw rate sensor 19 is different from the proper angular velocity of the above vehicle 100, the navigation unit 3 can calculate the estimated position of the above vehicle 100 with high accuracy, by using the corrected angular velocity φc that was corrected according to the slope angle θ of the above slope SL not the above angular velocity φ.

Thereby, even if the accurate present position based on position information PS could not be recognized, the navigation system 1 can display a highly-accurate estimated position based on a GPS signal velocity V and the corrected angular velocity φc on the map of a display screen; the user can see the estimated position of the vehicle 100.

(2-2) Velocity Output Processing Procedure

Figure 10:
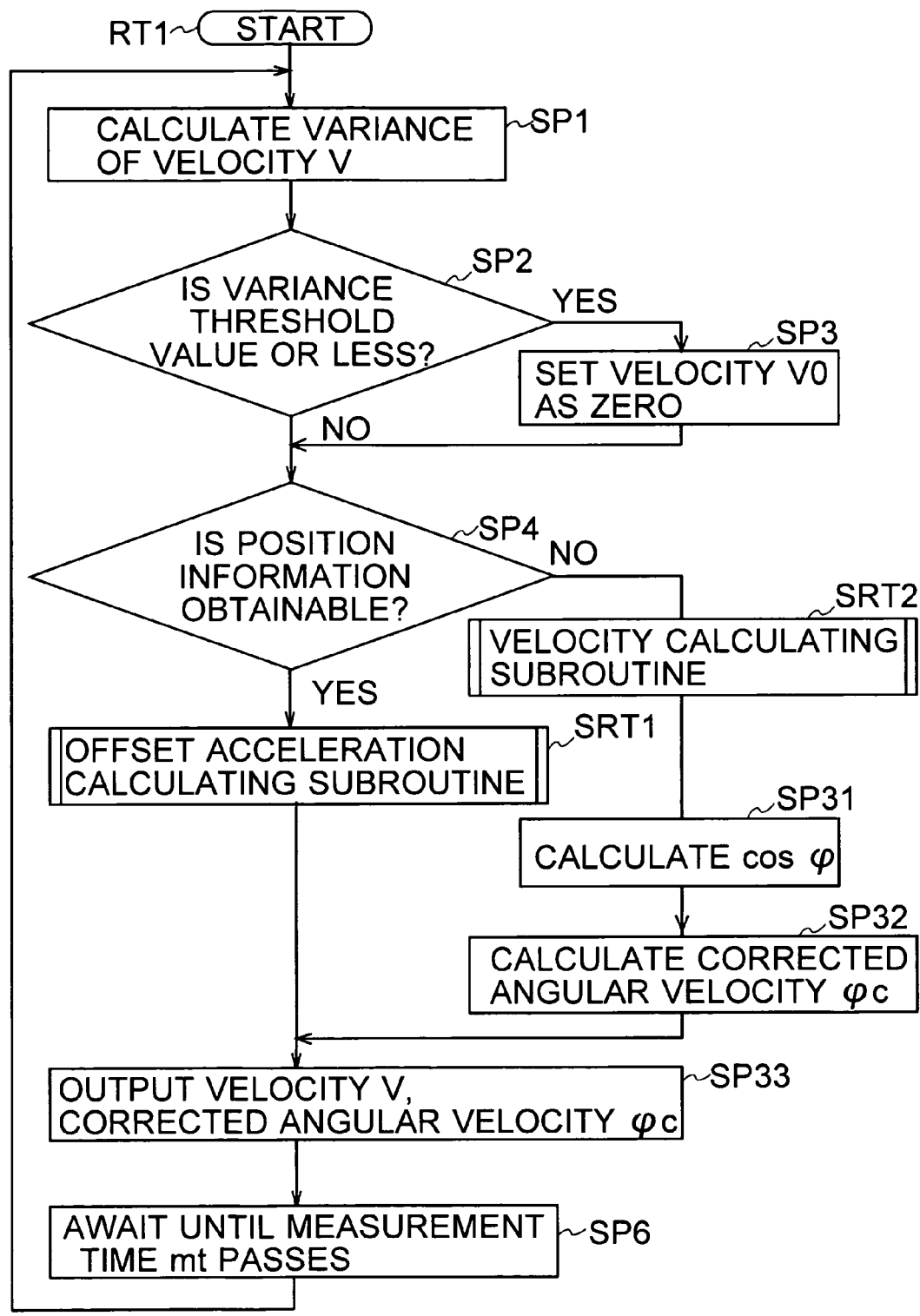
FIG. 10 is a flowchart showing a velocity output processing procedure according to the second embodiment.

Next, a velocity output processing-procedure when the velocity detecting unit 21 calculates the velocity V of the vehicle 100 and transmits this to the navigation unit 3 will be described, with reference to the flowchart of FIG. 10 in that the same reference numerals are added to the corresponding parts in FIG. 4.

If the power of the navigation system 20 is turned on, the operation processing block 22 of the velocity detecting unit 21 starts the velocity output processing procedure RT2 and proceeds to step SP1. Note that, because in this velocity output processing procedure RT2, steps SP1, SP2, SP3, SP4, subroutines SRT1, SRT2 and SRT3 are similar to the case of the velocity output processing procedure RT1 (FIG. 4), their description will be omitted.

After finished the subroutine SRT2, the operation processing block 22 proceeds to the next step SP31. At step SP31, the operation processing block 22 calculates a sin θ in accordance with Expression (16) using the amount of height change Dh that was calculated in accordance with Expression (8) and the moving distance Dm that was obtained based on the velocity V calculated in accordance with Expression (7), calculates a cos θ based on this in accordance with Expression (17), and proceeds to the next step SP32.

At step SP32, the operation processing block 22 calculates a corrected angular velocity φc by that an angular velocity φ was corrected in accordance with Expression (18), and proceeds to the next step SP33.

On the other hand, if the operation processing block 22 finishes the subroutine SRT1, it proceeds to the next step SP33.

At step SP33, the operation processing block 22 transmits the velocity V and the corrected angular velocity φc to the navigation unit 3, and proceeds to the next step SP6.

After the operation processing block 10 awaited until a measurement time mt passes at step SP6, similar to the case of the velocity output processing procedure RT1 (FIG. 4), it returns to step SP1 again to repeat a series of processing.

(2-3) Operation and Effect

According to the above configuration, similar to the velocity detecting unit 2 in the first embodiment, in the case where a GPS signal can be received by the GPS antenna 6, the velocity detecting unit 21 calculates offset acceleration αo by substituting the real detected acceleration αGr, the vehicle acceleration αP, the amount of height change Dh, the distance Dm and the gravity acceleration g in Expression (15).

Therefore, similar to the velocity detecting unit 2, in the case where position information PS can be obtained from the GPS processing section 4, the velocity detecting unit 21 can accurately calculate offset acceleration αo, by using the real detected acceleration αGr that was actually obtained from the acceleration sensor 11, the vehicle acceleration αP based on the position information PS, the distance Dm, the amount of height change Dh based on the pressure PR, and the gravity acceleration g.

Further, in the velocity detecting unit 21, in the case where position information PS cannot be obtained from the GPS processing section 4, a velocity V is calculated in accordance with Expression (7) without receiving the effect of a slope angle θ and also an angular velocity φ is corrected to a corrected angular velocity φc in accordance with Expression (18), according to the slope angle θ. Thereby, an error caused by the above slope angle θ can be removed.

At this time, the velocity detecting unit 21 can update offset acceleration αo on occasion. Therefore, even if position information PS became unable to be obtained from the GPS processing section 4 when the vehicle 100 is running because it suddenly entered a tunnel or was hidden in the shade of a building or the like, accurate dead reckoning (dead reckoning navigation) can be realized by using the velocity V and the corrected angular velocity φc that were calculated based on the latest offset acceleration αo.

According to the above configuration, similarly to the velocity detecting unit 2, in the case where position information PS can be obtained from the GPS processing section 4, the velocity detecting unit 21 can accurately calculate offset acceleration αo in accordance with Expression (15), by using the real detected acceleration αGr that was actually obtained from the acceleration sensor 11, the vehicle acceleration αP based on the position information PS, the distance Dm, the amount of height change Dh based on the pressure PR, and the gravity acceleration g. Thereby, an acceleration detection signal SA can be converted into detected acceleration αG with high accuracy, based on a zero gravity offset value Vzgo by that the above offset acceleration αo was converted.

(3) Other Embodiments

In the aforementioned embodiment, it has dealt with the case where vehicle acceleration αP is calculated based on position information PS supplied from the GPS processing section 4. However, the present invention is not only limited to this but also for example, a vehicle velocity pulse signal being a pulse signal having a cycle corresponding to the velocity may be obtained from the vehicle 100, and the above vehicle acceleration αP may be calculated based on this.

In the aforementioned embodiment, it has dealt with the case where a stop state of the vehicle 100 is determined based on the variance Vvar of the velocity V. However, the present invention is not only limited to this but also for example, the variance φvar of the angular velocity φ may be calculated, and a stop state of the above vehicle 100 may be determined based on the above variance φvar.

Further, in the aforementioned embodiment, it has dealt with the case where offset acceleration αo is calculated, using the detected acceleration αG0 at the time t0 in step SP15 of the offset acceleration calculating subroutine SRT1 (FIG. 5). However, the present invention is not only limited to this but also the above offset acceleration αo may be calculated, for example, by using the detected acceleration αG1 at the time t1, or by using the mean value of the detected acceleration αG0 and the detected acceleration αG1, or the like.

Further, in the aforementioned embodiment, it has dealt with the case where the amount of height change Dh is calculated based on the amount of change of the surrounding pressure PR. However, the present invention is not only limited to this but also for example, a vertical acceleration sensor for detecting acceleration in the vertical direction may be provided and a detected value by the above vertical acceleration sensor may be converted into an amount of height change.

Further, in the aforementioned embodiment, it has dealt with the case of converting from the pressure PR into the height h in accordance with the pressure/height correspondence table TBL previously stored in the memory section 18. However, the present invention is not only limited to this but also height h may be calculated in accordance with the following expression, based on pressure PR.

$$h = 153.8 \times (t_z + 273.2) \times \left(1 - \left(\frac{PR}{PR_z}\right)^{0.1902}\right) \quad (19)$$

Here, $t_z$ represents a temperature at height h=0 m, and $PR_z$ represents pressure at height h=0 m.

Thereby, although the quantity of operation processing increases, the calculation accuracy of the height h can be improved.

Figure 11:
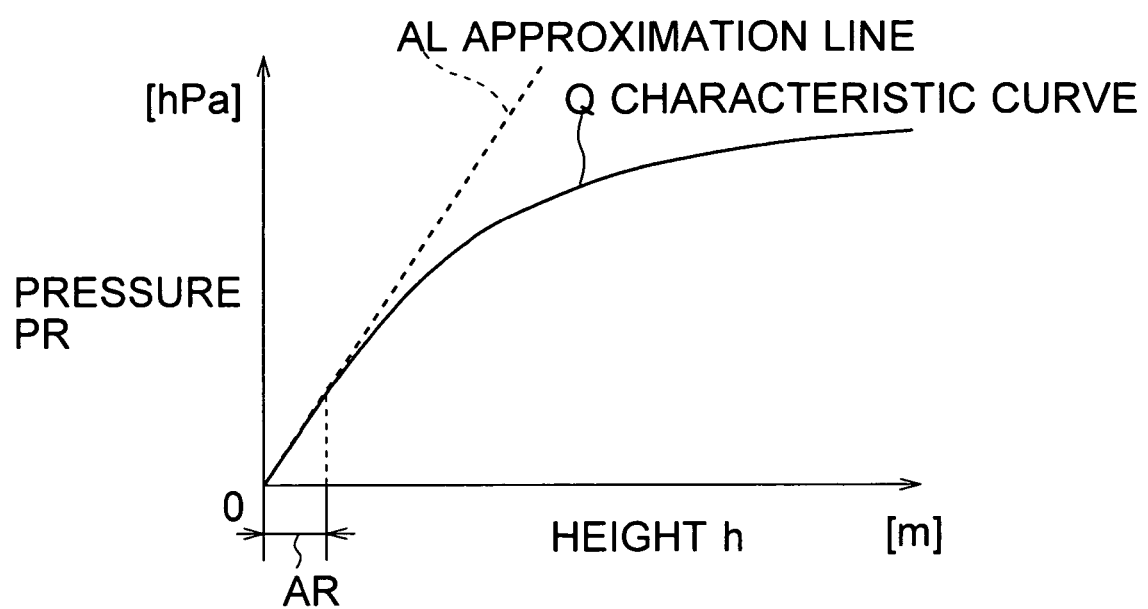
FIG. 11 is a schematic diagram showing the relationship between pressure and height.

Further, in this case, as shown in FIG. 11 in that Expression (19) was graphed, at a part AR in that a height is comparatively low, a characteristic curve Q can be approximated as an approximation line AL. Therefore, in the case where it has been known that the height at the present position of the vehicle 100 is comparatively low, the amount of height change Dh may be approximately calculated in accordance with the following expression representing the approximation line AL.

$$Dh = -8.73 \times (PR1 - PR0) \quad (20)$$

Thereby, operation processing in the operation processing blocks 10 and 22 can be simplified in comparison to the case of performing the operation of Expression (19).

Further, in the aforementioned embodiments, it has dealt with the case where when it was determined that Expression (9) was not satisfied and the amount of height change Dh was receiving the effect of a non-height factor, the corrected amount of height change Dhc calculated by Expression (10) is set as a new amount of height change Dh. However, the present invention is not only limited to this but also a new amount of height change Dh may be calculated by other technique such that sets the last amount of height change Dh as a new amount of height change Dh as it is, or that calculates a predicted value of the amount of height change Dh at this time based on the before last amount of height change Dh and the last amount of height change Dh and sets this as a new amount of height change Dh.

Further, in the aforementioned embodiments, it has dealt with the case where whether or not the amount of height change Dh calculated by Expression (8) is receiving the effect of a non-height factor is determined by Expression (9) using the maximum slope angle θmax. However, the present invention is not only limited to this but also for example, a maximum amount of height change Dhmax may be prescribed as the maximum value takable as the amount of height change Dh, and whether or not the amount of height change Dh is receiving the effect of a non-height factor may be determined, based on the comparison result between the absolute value of the amount of height change Dh and the maximum amount of height change Dhmax.

Here, if it was determined that the amount of height change Dh was receiving the effect of a non-height factor, it is good to perform the following processing by setting the maximum amount of height change Dhmax as a new amount of height change Dh.

Further, a slope change rate λ may be prescribed as an amount of change of the slope angle θ per unit time, and whether or not the amount of height change Dh is receiving the effect of a non-height factor may be determined using the above slope change rate λ.

For example, as the maximum value takable as the slope change rate λ in a normal run of the vehicle 100, the maximum slope change rate $\lambda$ is previously set. The velocity detecting unit 2 may calculate a slope angle immediately before $\theta0$ in accordance with the following expression obtained from the relationship shown in FIG. 2C, by using the amount of height change Dh and the distance Dm at the time immediately before t0.

$$\theta = \sin^{-1}\left(\frac{Dh}{Dm}\right) \quad (21)$$

And the velocity detecting unit 2 may determine whether or not the amount of height change Dh is receiving the effect of a non-height factor, based on whether or not the following expressions are satisfied.

$$Dh > V0 \cdot \sin(-\lambda\max + \theta) \quad (22a)$$

$$Dh < V0 \cdot \sin(\lambda\max + \theta) \quad (22b)$$

Here, if Expressions (22a) and (22b) were not satisfied and it was determined that the amount of height change Dh was receiving the effect of a non-height factor, it is good to calculate a corrected amount of height change Dhc2 in accordance with the following expression and set this as a new amount of height change Dh.

$$Dhc2 = V0 \cdot \sin(\lambda\max + \theta) \cdot \frac{|Dh|}{Dh} \quad (23)$$

Furthermore, whether or not the amount of height change Dh is receiving the effect of a non-height factor may be determined using an acceleration component applied to the vehicle 100 in the vertical direction (a so-called vertical G, hereinafter, this is referred to as vertical acceleration av).

In accordance with a general physical principle, the relationship of the following expression is satisfied between the vertical acceleration av and the slope change rate $\lambda$.

$$\lambda = \frac{av}{V0} \quad (24)$$

Then, a maximum vertical acceleration avmax may be previously set as the maximum value takable as the vertical acceleration av in a normal run of the vehicle 100, and in the velocity detecting unit 2, whether or not the amount of height change Dh is receiving the effect of a non-height factor may be determined, based on whether or not the following expressions obtained by applying Expression (24) to Expression (22) are satisfied.

$$Dh > V0 \cdot \sin\left(-\frac{av\max}{V0} + \theta\right) \quad (25a)$$

$$Dh < V0 \cdot \sin\left(\frac{av\max}{V0} + \theta\right) \quad (25b)$$

Here, if Expressions (25a) and (25b) were not satisfied and it was determined that the amount of height change Dh was receiving the effect of a non-height factor, it is good to calculate a corrected amount of height change Dhc3 in accordance with the following expression, and set this as a new amount of height change Dh.

$$Dhc3 = V0 \cdot \sin\left(\frac{av\max}{V0} + \theta\right) \cdot \frac{|Dh|}{Dh} \quad (26)$$

Further, in the aforementioned embodiments, it has dealt with the case where position information PS is generated by the GPS processing section 4 based on a GPS signal received by the GPS antenna 6. However, the present invention is not only limited to this but also position information PS may be generated by utilizing various satellite positioning systems such as the Quasi-Zenith Satellite System (QZSS), the Global Navigation Satellite System (GLONASS), and the Galileo and receiving their respective positioning signals, and performing positioning processing.

Further, in the aforementioned embodiments, it has dealt with the case where the present invention is applied to the navigation systems 1 and 20 installed in the vehicle 100. However, the present invention is not only limited to this but also may be applied to various electronic equipment that realizes a navigation function without using a vehicle velocity pulse signal or a signal similar to this, such as a portable navigation system, a PDA having GPS receiving function, a cellular phone, and a personal computer. In this case, the above electronic equipment is not limited to the vehicle 100, and it may be installed in shipping and aircraft or the like, or it may be used solely.

Further, in the aforementioned embodiments, it has dealt with the case where the velocity detecting units 2 and 21 serving as offset detecting systems of an acceleration sensor have the acceleration sensor 11 serving as an acceleration sensor, the operation processing block 10 serving as acceleration to be detected calculating means, and the offset calculating section 17 serving as offset calculating means. However, the present invention is not only limited to this but also an offset detecting system of an acceleration sensor may have an acceleration sensor, acceleration to be detected calculating section and an offset calculating section that have various circuit configurations other than them.

Note that, an embodiment according to the present invention also can be used in various navigation systems having an acceleration sensor.

According to an embodiment of the present invention, an offset detecting system of an acceleration sensor, an offset detecting method of an acceleration sensor, and an offset detecting program of an acceleration sensor in that offset variance can be calculated only based on the difference between real detected acceleration and acceleration to be detected, and accurate real detected acceleration $\alpha$Gr in that the above offset variance is reflected can be obtained, thus zero gravity offset in the acceleration sensor can be detected with high accuracy can be realized.

Further, according to an embodiment of the present invention, a navigation system in which offset variance can be calculated only based on the difference between real detected acceleration and acceleration to be detected, and accurate information on the position of a mobile body can be displayed by reflecting the above offset variance can be realized.

While there has been described in connection with the preferred embodiments of the present invention, it will be obvious to those skilled in the art that various changes, modifications, combinations, sub-combinations and alternations may be aimed, therefore, to cover in the appended claims all such changes, and modifications as fall within the true spirit and scope of the present invention.

What is claimed is:

1. An offset detecting system of an acceleration sensor, comprising:
    an acceleration sensor to obtain real detected acceleration corresponding to a sum of an offset variance and acceleration in a forward direction of a predetermined mobile body;
    calculating means for calculating a true acceleration that should be correctly detected by said acceleration sensor;
    offset calculating means for calculating said offset variance representing an amount that said real detected acceleration varied from the true acceleration due to a characteristic of said acceleration sensor, based on a difference between said real detected acceleration and the true acceleration;
    a pressure sensor to detect pressure; and
    moving distance calculating means for calculating a moving distance of said mobile body in a predetermined measurement time,
    wherein said calculating means calculates an amount of height change of said mobile body in said measurement time, based on the pressure detected by said pressure sensor, and calculates a component in said forward direction of gravity acceleration using a ratio of said moving distance to the amount of height change, and a gravity acceleration constant.

2. The offset detecting system of an acceleration sensor according to claim 1, wherein
    said calculating means calculates said true acceleration by calculating a sum of mobile body acceleration representing an acceleration of said mobile body itself and the component in said forward direction of the gravity acceleration operating on said mobile body respectively.

3. The offset detecting system of an acceleration sensor according to claim 2, wherein
    when said amount of height change is not within a predetermined range of height change, said calculating means corrects said amount of height change to be within the range of height change.

4. The offset detecting system of an acceleration sensor according to claim 2, wherein
    said calculating means determines whether or not said amount of height change is within said range of height change based on a maximum slope angle representing a maximum value of a slope angle that is obtained from said amount of height change.

5. The offset detecting system of an acceleration sensor according to claim 2, wherein
    said calculating means determines whether or not said amount of height change is within said range of height change based on a maximum slope change rate representing a maximum value of a slope change rate per unit time of a slope angle that is obtained from said amount of height change.

6. The offset detecting system of an acceleration sensor according to claim 2, wherein
    said moving distance calculating means calculates said moving distance using position information or velocity information obtained by predetermined satellite positioning signal receiving and positioning means.

7. An offset detecting method of an acceleration sensor, comprising:
    obtaining, by an acceleration sensor, real detected acceleration corresponding to a sum of an offset variance and acceleration in a forward direction of a predetermined mobile body;
    calculating a true acceleration that should be correctly detected by said acceleration sensor;
    calculating said offset variance representing an amount that said real detected acceleration varied from the true acceleration due to a characteristic of said acceleration sensor, based on a difference between said real detected acceleration and the true acceleration; and
    calculating a moving distance of said mobile body in a predetermined measurement time,
    wherein said step of calculating the true acceleration calculates an amount of height change of said mobile body in said measurement time, based on a pressure detected by a pressure sensor, and calculates a component in said forward direction of gravity acceleration using a ratio of said moving distance to the amount of height change, and a gravity acceleration constant.

8. A computer readable medium storing an offset detecting program that, when executed, causes an offset detecting system of an acceleration sensor to execute the steps of:
    obtaining, by an acceleration sensor, real detected acceleration corresponding to a sum of an offset variance an acceleration in a forward direction of a predetermined mobile body;
    calculating a true acceleration that should be correctly detected by said acceleration sensor;
    calculating said offset variance representing an amount that said real detected acceleration varied from the true acceleration due to a characteristic of said acceleration sensor, based on a difference between said real detected acceleration and the true acceleration; and
    calculating a moving distance of said mobile body in a predetermined measurement time,
    wherein said step of calculating the true acceleration calculates an amount of height change of said mobile body in said measurement time, based on a pressure detected by a pressure sensor, and calculates a component in said forward direction of gravity acceleration using a ratio of said moving distance to the amount of height change, and a gravity acceleration constant.

9. A navigation systems comprising:
    present position calculating means for receiving a positioning signal from a predetermined satellite positioning system, and for calculating a present position of a predetermined mobile body;
    an acceleration sensor to obtain real detected acceleration corresponding to a sum of an offset variance and acceleration in a forward direction of a predetermined mobile body;
    calculating means for calculating a true acceleration that should be correctly detected by said acceleration sensor;
    offset calculating means for calculating said offset variance representing an amount that said real detected acceleration varied from the true acceleration due to a characteristic of said acceleration sensor, based on a difference between said real detected acceleration and the acceleration;
    information display means for calculating said true acceleration using said offset variance that was calculated by said offset calculating means, and displaying information on a position of said mobile body based on a velocity of said mobile body calculated using the true acceleration;
    a pressure sensor to detect pressure; and
    moving distance calculating means for calculating a moving distance of said mobile body in a predetermined measurement time, wherein said calculating means calculates an amount of height change of said mobile body in said measurement time, based on the pressure detected by said pressure sensor, and calculates a component in said forward direction of gravity acceleration using a ratio of said moving distance to the amount of height change, and a gravity acceleration constant.

10. An offset detecting system of an acceleration sensor, comprising:

an acceleration sensor to obtain real detected acceleration corresponding to a sum of an offset variance and acceleration in a forward direction of a predetermined mobile body;

a calculating section configured to calculate a true acceleration that should be correctly detected by said acceleration sensor;

an offset calculating section configured to calculate said offset variance representing an amount that said real detected acceleration varied from the true acceleration due to a characteristic of said acceleration sensor, based on a difference between said real detected acceleration and the true acceleration;

a pressure sensor to detect pressure; and a moving distance calculating section configured to calculate a moving distance of said mobile body in a predetermined measurement time, wherein said calculating section calculates an amount of height change of said mobile body in said measurement time, based on the pressure detected by said pressure sensor, and calculates a component in said forward direction of gravity acceleration using a ratio of said moving distance to the amount of height change, and a gravity acceleration constant.

11. The offset detecting system of an acceleration sensor according to claim 10, wherein;

said calculating section calculates said true acceleration by calculating a sum of mobile body acceleration representing an acceleration of said mobile body itself and the component in said forward direction of the gravity acceleration operating on said mobile body.

12. The offset detecting system of an acceleration sensor according to claim 11, wherein when said amount of height change is not within a predetermined range of height change, said calculating section corrects said amount of height change to be within the range of height change.

13. The offset detecting system of an acceleration sensor according to claim 11, wherein said calculating section determines whether or not said amount of height change is within said range of height change based on a maximum slope angle representing a maximum value of a slope angle that is obtained from said amount of height change.

14. The offset detecting system of an acceleration sensor according to claim 11, wherein said calculating section determines whether or not said amount of height change is within said range of height change based on a maximum slope change rate representing a maximum value of a slope change rate per unit time of a slope angle that is obtained from said amount of height change.

15. The offset detecting system of an acceleration sensor according to claim 11, wherein said moving distance calculating section calculates said moving distance using position information or velocity information obtained by a predetermined satellite positioning signal receiving and positioning section.

* * * * *